United States Patent
Deng et al.

(10) Patent No.: US 7,912,665 B2
(45) Date of Patent: Mar. 22, 2011

(54) METHOD AND APPARATUS FOR DRIVER HANDS OFF DETECTION FOR VEHICLES WITH ACTIVE FRONT STEERING SYSTEM

(75) Inventors: Weiwen Deng, Rochester Hills, MI (US); Yong H. Lee, Tory, MI (US); Haicen Zhang, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 153 days.

(21) Appl. No.: 12/275,831

(22) Filed: Nov. 21, 2008

(65) Prior Publication Data

US 2010/0131233 A1     May 27, 2010

(51) Int. Cl.
*G06F 15/00*     (2006.01)
(52) U.S. Cl. ........ 702/109; 702/108; 702/113; 702/147; 702/148; 702/150; 702/182; 701/41; 701/42; 701/57; 701/58; 701/59; 701/60; 180/400; 180/443
(58) Field of Classification Search .................. 702/109, 702/108, 113, 147, 148, 150, 182; 701/41, 701/42, 57–60; 180/400, 443
See application file for complete search history.

(56) References Cited

U.S. PATENT DOCUMENTS

| | | | |
|---|---|---|---|
| 2004/0039507 A1* | 2/2004 | Yao et al. | 701/41 |
| 2005/0242965 A1* | 11/2005 | Rieth et al. | 340/575 |
| 2006/0235591 A1* | 10/2006 | Tamaizumi | 701/41 |

* cited by examiner

*Primary Examiner* — Sujoy K Kundu
(74) *Attorney, Agent, or Firm* — John A. Miller; Miller IP Group, PLC

(57) ABSTRACT

A system and method for detecting the absence of contact between the hands of a driver of a vehicle and a steering wheel of the vehicle that have particular application in ensuring the proper functioning of various components of the driver assist steering systems and maintaining driver attentiveness. The method for detecting a no-contact condition between the hands of the driver of the vehicle and the steering wheel includes generating a model of the no-contact condition using a second-order transfer function. The method further includes obtaining a set of model-generated steering dynamics by estimating a plurality of parameters of the second-order transfer function and a set of measured steering dynamics using a plurality of sensors. The set of model-generated steering dynamics and the set of measured steering dynamics are then compared and the no-contact condition is detected based on this comparison.

20 Claims, 3 Drawing Sheets though a person's hand-on weight is 3 to 4 Kg and there is a significant moment of inertia added to the steering system 10, the direction of this moment is random. Therefore, the moment of inertia added by the driver's hands can be treated as noise, and by modeling the hands-off condition ideally, the noise added by the driver can be detected. In doing so, it will help in detecting the hands-on condition of the driver.

METHOD AND APPARATUS FOR DRIVER HANDS OFF DETECTION FOR VEHICLES WITH ACTIVE FRONT STEERING SYSTEM

BACKGROUND OF THE INVENTION

1. Field of the Invention

This invention relates generally to a system and method for detecting the absence of contact between the hands of a driver of a vehicle and a steering wheel of the vehicle and, more particularly, to a system and method for detecting a condition when the driver's hands are off the steering wheel of a vehicle to maintain attentiveness of the driver and ensure proper functioning of various steering actuators.

2. Description of the Related Art

The automobile industry has been making constant efforts to enhance comfort and safety of the occupants of a vehicle, especially the driver. These endeavors have resulted in the birth of technologies such as advanced driver assistance systems (ADAS) and electronic stability control (ESC) systems. Some of the features of ADAS are adaptive cruise control systems, lane assist systems and driver assist steering systems. ESC systems, on the other hand, use computerized technologies that improves vehicle handling by detecting and preventing unstable conditions.

One of the above-mentioned features of the ADAS, the driver assist steering system or the active front steering system, hereinafter used interchangeably, is a complementary system for a front-steered vehicle that adds or subtracts a component to the angular movement of the steering wheel in order to reduce the driver effort required to rotate the steering wheel or augment the driver steering for improved vehicle safety and stability. The resulting steering angle is thus composed of the steering input by the driver and the component contributed by the steering system.

ADAS and ESC systems aid the driver by reducing the driving burden. However, it is not desirable to reduce the driver's vigilance and attentiveness, even when such systems are exercising some or most of the control over the vehicle. It is generally imperative that the driver puts his/her hands on the steering wheel, and be ready to takeover the steering control whenever the situation demands. Further, various steering actuators used in an active front steering systems function properly only when the driver has his hands on the steering wheel while the vehicle is in motion.

Moreover, detection of a no-contact condition between the driver's hands and the steering wheel of the vehicle can act as an alarm for the various human machine interface friendly ADAS and ECS systems prompting them to kick in and take over the control of the vehicle.

SUMMARY OF THE INVENTION

In accordance with the teachings of the present invention, a system and method for detecting the absence of contact between the hands of a driver of a vehicle and a steering wheel of the vehicle are disclosed that have particular application in ensuring the proper functioning of various components of the driver assist steering systems and maintaining driver attentiveness. The method for detecting a no-contact condition between the hands of the driver of the vehicle and the steering wheel includes generating a model of the no-contact condition using a second-order transfer function. The method further includes obtaining a set of model-generated steering dynamics by estimating a plurality of parameters of the second-order transfer function and a set of measured steering dynamics using a plurality of sensors. The set of model-generated steering dynamics and the set of measured steering dynamics are then compared and the no-contact condition is detected based on this comparison.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for detecting the absence of contact between the hands of a driver of a vehicle and a steering wheel of the vehicle is merely exemplary in nature, and is in no way intended to limit the invention or its applications or uses. For example, the method has specific application in ensuring the proper functioning of various components of driver assist steering systems and maintaining driver attentiveness. However, as will be appreciated by those skilled in the art, the method for detecting a condition when the hands of the driver are off the steering wheel may have other applications.

Figure 1:
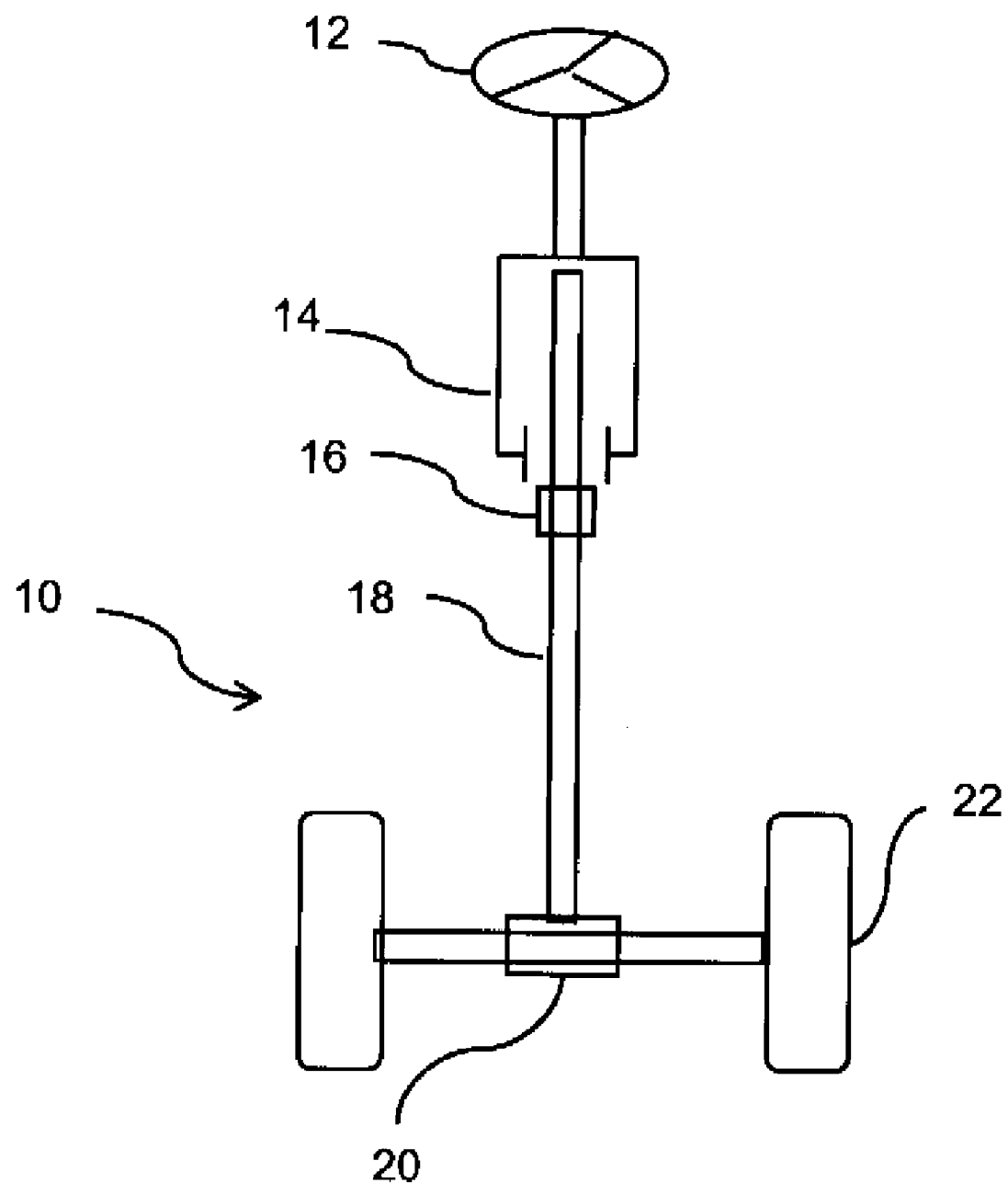
FIG. 1 is a driver assist steering system illustrating a schematic of a steering actuator.

FIG. 1 is a driver assist steering system 10 illustrating a schematic of a steering actuator, according to one embodiment. The system 10 includes a steering wheel 12 that is rotated to steer the vehicle in the desired direction. The steering wheel 12 is connected to an electric motor 14 that assists the driver by adding a component to the steering wheel rotation, thereby reducing the driver's effort. The rotation component added by the electric motor 14 is based on the direction of rotation of the steering wheel 12, the speed of the vehicle and the angle overlay command provided externally. Further, a gear reduction unit 16 is part of the electric motor 14 in the active front steer system to amplify the torque output and to increase the angular resolution. The rotation of the gears is transmitted to a rack and pinion pair 20 using an output shaft 18. Finally, the rack and pinion pair 20 converts the rotary motion of the output shaft into a linear motion of the tires 22 of the vehicle.

In the present invention, the dynamics of the steering system are modeled for a condition where the driver's hands are off the steering wheel of the vehicle, hereinafter referred to as the driver's hands-off condition. Further, the real time steering dynamics of the vehicle are compared with those generated by the model and this comparison is used to detect a driver's hands-off condition.

In the driver's hands-off condition, there are no unknown tire forces, road disturbances and other unknown driver-added moments of inertia acting on the steering system 10. In such a situation, the electric motor 14 follows the path of least resistance and rotates the steering wheel 12, accordingly. Thus, the steering dynamics in the driver's hands-off condition follow a definite pattern and can be modeled using a pre-defined second-order function. Considering a hands-off situation for a rotation angle $\hat{\theta}_m(t)$ of the motor 14, hereinafter referred to as the motor angle, let the steering wheel be rotated by an angle $\hat{\theta}_s(t)$, hereinafter referred to as the steering wheel angle. The relationship of the steering wheel angle $\hat{\theta}_s(t)$ with the corresponding motor angle $\hat{\theta}_m(t)$ is depicted by the following second-order transfer function.

$$\frac{\hat{\theta}_s(s)}{\hat{\theta}_m(s)} = \frac{K_{ss}\omega_n^2}{s^2 + 2s\zeta\omega_n + \omega_n^2} \quad (1)$$

Where $\hat{\theta}_s(s)$ is the steering wheel angle in the frequency domain, $\hat{\theta}_m(s)$ is the motor angle in the frequency domain, $K_{ss}$ is the steady state gain, $\zeta$ is the damping coefficient, and $\omega_n$ is the natural frequency of the steering system.

During the real time implementation of this method, the parameters of the second-order transfer function, namely, $K_{ss}$, $\zeta$ and $\omega_n$, can be calculated using various techniques that do not form a part of the calculations performed on-board the vehicle. The value of these parameters can be taken to be dependent on vehicle speed in a driver's hands-off condition. Hence, these parameters are obtained using look-up tables or graphs that depict a set of values of $K_{ss}$, $\zeta$ and $\omega_n$ corresponding to a set of vehicle speed values $v_x$. Further, the values of these parameters along with the motor angle command $\hat{\theta}_m(t)$ generated by the steering control system are introduced into the second-order transfer function and a model generated steering wheel angle $\hat{\theta}_s(t)$ corresponding to the hands-off condition is obtained. At the same time, a sensor (not shown) connected to the steering wheel 12 is used to obtain a measured steering wheel angle $\theta_s(t)$ for the same vehicle speed at which the model generated steering wheel angle $\hat{\theta}_s(t)$ was calculated. Further, a comparison is done between the model generated steering wheel angle $\hat{\theta}_s(t)$ and the measured steering wheel angle $\theta_s(t)$ to determine if the driver's hands are off the steering wheel 12. If the values of the model generated steering wheel angle $\hat{\theta}_s(t)$ and the measured steering wheel angle $\theta_s(t)$ are found to correlate, a driver hands-off condition is said to be present, and if the values do not correlate, the driver's hands are assumed to be present on the steering wheel 12.

Figure 2:
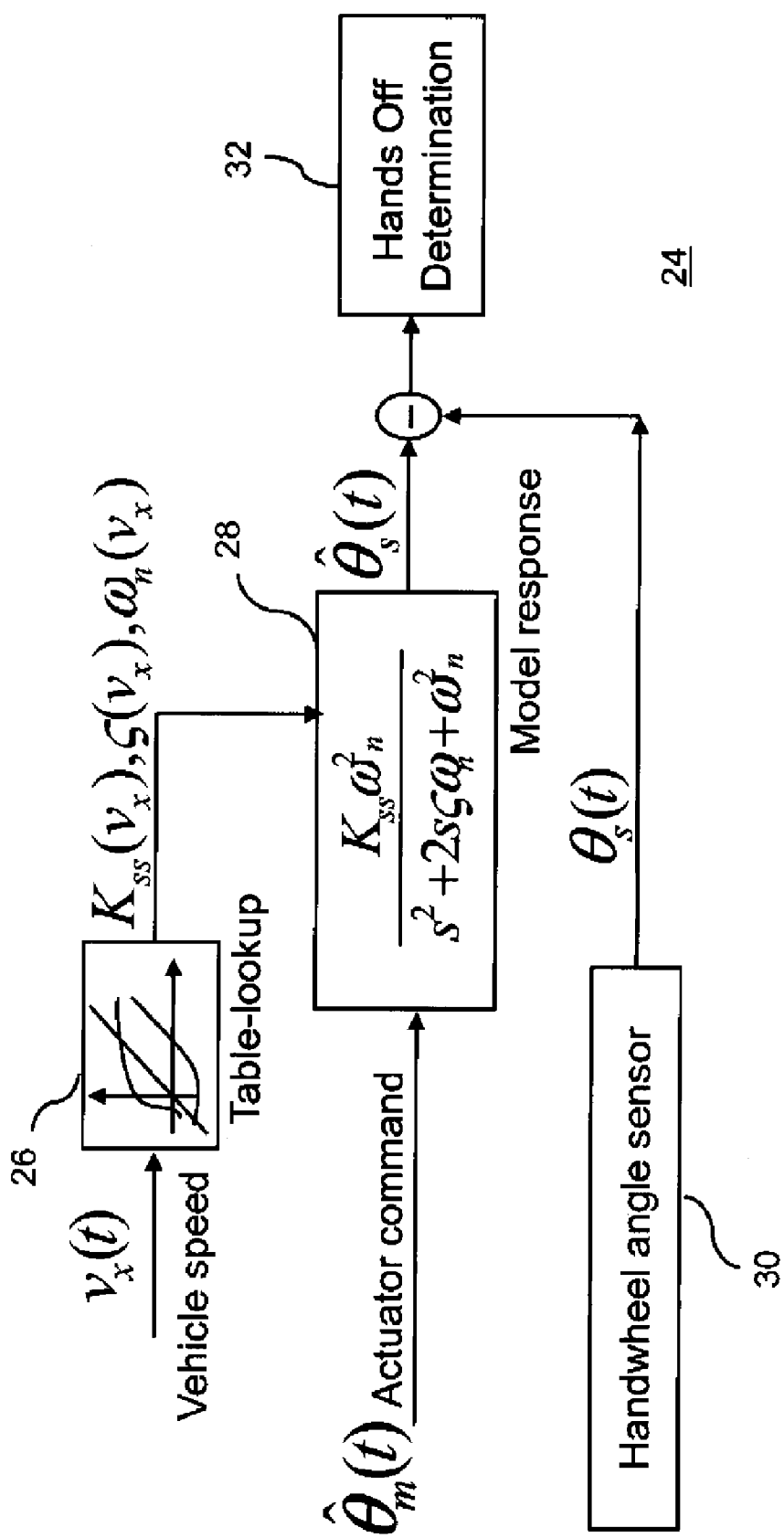
FIG. 2 is a block diagram illustrating a method for detecting the absence of contact between the hands of a driver of a vehicle and a steering wheel of the vehicle.

FIG. 2 is a block diagram illustrating a method for detecting the absence of contact between the hands of a driver of a vehicle and the steering wheel 12 of the vehicle. At box 26, the instantaneous values of the input parameters $K_{ss}$, $\zeta$ and $\omega_n$ of the second-order transfer function from equation (1) corresponding to the vehicle speed at that instant are obtained using a look-up table or a graph, as described above. These instantaneous values are received at box 28, where the instantaneous values of the parameters along with the instantaneous motor angle command $\hat{\theta}_m(t)$, calculated by the motor actuator control algorithm, are used to calculate the instantaneous model generated steering wheel angle $\hat{\theta}_s(t)$, as described in FIG. 1. At box 30, the instantaneous value of the measured steering wheel angle $\theta_s(t)$ is obtained, as described above. The measured steering wheel angle $\theta_s(t)$ and the model steering wheel angle $\hat{\theta}_s(t)$ are then compared at box 32 and if their values are found to be equal, it is determined that the driver's hands are off the steering wheel at box 32.

Figure 3:
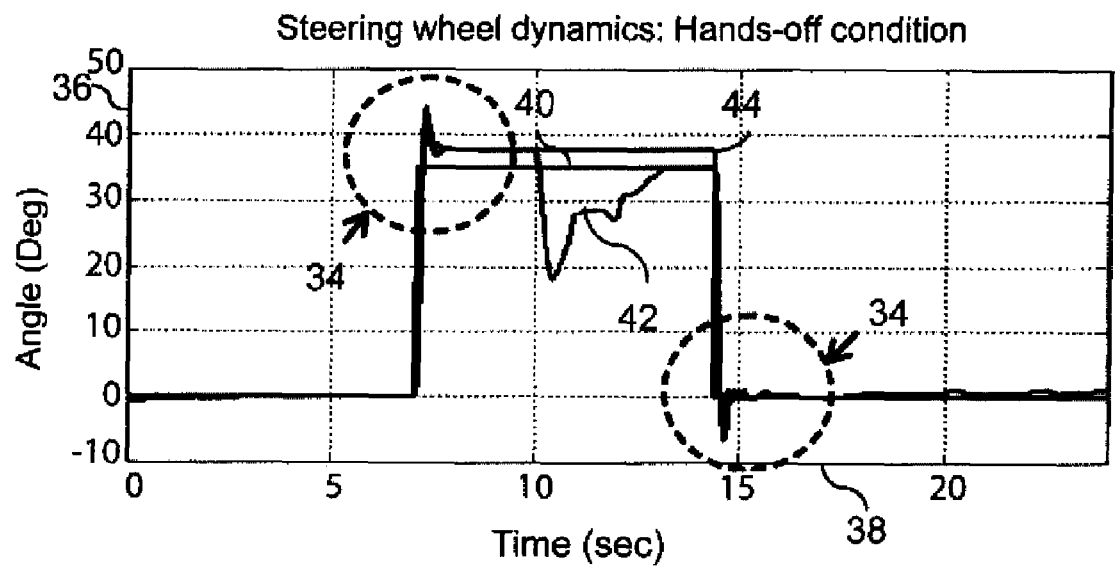
FIG. 3 is an exemplary chart depicting the time variations of the measured steering wheel angle when the driver's hands are off the steering wheel and the model generated steering wheel angle, where the model is generated using the second-order transfer function.

FIG. 3 is an exemplary chart depicting the time variations of the measured steering wheel angle when the driver's hands are off the steering wheel and the model generated steering wheel angle, where the model is generated using the second-order transfer function. The Y-axis 36 represents the steering angle in degrees and the X-axis represents time in seconds. Curve 40 represents the variation of the motor angle command $\hat{\theta}_m(t)$ with time, curve 42 represents the variation of the measured steering wheel angle $\theta_s(t)$ with time and curve 44 represents the variation of the model generated steering wheel angle $\hat{\theta}_s(t)$ with time. It can be clearly seen that areas 34 represent the driver's hands-off condition where the curve 42 approximately superimposes on the curve 44.

Figure 4:
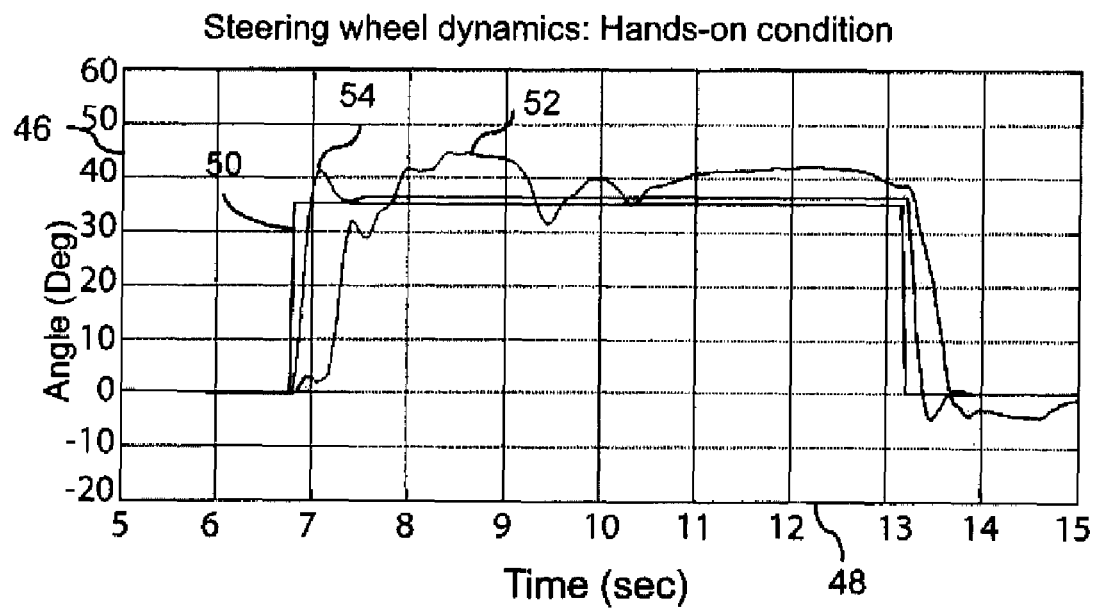
FIG. 4 is an exemplary chart depicting the time variations of the measured steering wheel angle when the driver's hands are on the steering wheel and the model generated steering wheel angle, where the model is generated using the second-order transfer function.

FIG. 4 is an exemplary chart depicting the time variations of the measured steering wheel angle when the driver's hands are on the steering wheel 12 and the model generated steering wheel angle, where the model is generated using the second-order transfer function. The Y-axis 46 represents the steering angle in degrees while the X-axis 48 represents time in seconds. Curve 50 represents the variation of the motor angle $\hat{\theta}_m(t)$ with time, curve 52 represents the variation of the measured steering wheel angle $\theta_s(t)$ with time while curve 54 represents the variation of the model generated steering wheel angle $\hat{\theta}_s(t)$ with time. It can be clearly seen that steering dynamics in the hands-on case become non-linear and of a higher order. This happens due to various factors, such as unknown driver's torque input and unknown tire forces. Hence, it becomes very difficult to model a hands-on condition and detecting the contact state of the driver hands with steering wheel using that model.

Various embodiments of the present invention offer one or more advantages. The present invention provides a method for detecting the absence of contact between the hands of a driver of a vehicle and a steering wheel of the vehicle. The method of the present invention provides a means to maintain driver attentiveness and to ensure proper functioning of the various components of the steering system.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for detecting a no-contact condition between hands of a driver of a vehicle and a steering wheel of the vehicle, where the no-contact condition indicates an absence of contact between the hands of the driver and the steering wheel of the vehicle, said method comprising:
    generating a model of the no-contact condition using a second-order transfer function;
    obtaining a set of model-generated steering dynamics by estimating a plurality of parameters of the second-order transfer function of the no-contact condition; obtaining a set of measured steering dynamics from a plurality of sensors;
    using a controller, comparing the set of model-generated steering dynamics and the set of measured steering dynamics; and
    detecting the no-contact condition based on the comparison between the set of model-generated steering dynamics and the set of measured steering dynamics.

2. The method according to claim 1 wherein the estimation of the plurality of parameters of the second-order transfer function is done using a plurality of offline parameter identification techniques.

3. The method according to claim 2 wherein estimation of a plurality of parameters of the model is done using an arranged set of data, wherein the arranged set of data is a representation of a set of values of the plurality of parameters of the model corresponding to a set of vehicle speed values.

4. The method according to claim 3 wherein the arranged set of data is a table.

5. The method according to claim 3 wherein the arranged set of data is a graph.

6. The method according to claim 1 wherein obtaining the set of model-generated steering dynamics includes a motor angle command a steering assist motor.

7. The method according to claim 1 wherein the plurality of parameters is selected from a group comprising a steady state gain, a damping ratio and a natural frequency of a vehicle steering system.

8. The method according to claim 1 wherein obtaining the set of measured steering dynamics includes measuring an angle of rotation of the steering wheel of the vehicle.

9. The method according to claim 1 wherein the set of measured steering dynamics is obtained using at least one sensor.

10. A system for detecting a no-contact condition between hands of a driver of a vehicle and a steering wheel of the vehicle, where the no-contact condition indicates an absence of contact between the hands and the steering wheel of the vehicle, said system comprising:
    a first module for generating a model of the no-contact condition using a second-order transfer function;
    a second module for obtaining a set of model-generated steering dynamics by estimating a plurality of parameters of the second-order transfer function of the no-contact condition;
    at least one sensing device for obtaining a set of measured steering wheel responses; and
    an execution module for comparing the set of model-generated steering wheel responses and the set of measured steering wheel responses, wherein the no-contact condition is detected based on the comparison between the set of model-generated steering wheel responses and the set of measured steering wheel responses.

11. The system according to claim 10 wherein the at least one sensing device is a sensor used to measure the angle of rotation of the steering wheel of the vehicle.

12. The system according to claim 10 wherein the second module includes a computed motor actuator command, said motor actuator command being used to command a steering assist motor, wherein the motor angle command is used to obtain the set of model-generated steering wheel responses.

13. The system according to claim 10 wherein the estimation of the plurality of parameters of the second-order transfer function is done using a plurality of offline parameter identification techniques.

14. The system according to claim 13 wherein estimating the plurality of parameters of the model is done using an arranged set of data, wherein the arranged set of data is a representation of a set of values of the plurality of parameters of the model corresponding to a set of vehicle speed values.

15. The system according to claim 14 wherein the arranged set of data is a table.

16. The system according to claim 14 wherein the arranged set of data is a graph.

17. The system according to claim 10 wherein the plurality of parameters are selected from a group comprising a steady state gain, a damping ratio and a natural frequency of a vehicle steer system.

18. A system for detecting a no-contact condition between hands of a driver of a vehicle and a steering wheel of the vehicle, where the no-contact condition indicates an absence of contact between the hands and the steering wheel of the vehicle, said system comprising:
    a first sub-system that generates a model of the no-contact condition using a second-order transfer function;
    a second sub-system that obtains a set of model-generated steering dynamics by estimating a plurality of parameters of the second-order transfer function of the no-contact condition, said second sub-system including a motor actuator command that commands a steering assist motor, wherein the motor angle command is used to obtain a set of model-generated steering wheel responses, and wherein estimating the plurality of parameters of the second-order transfer function is done using offline parameter identification techniques;
    a sensor for measuring the angle of rotation of the steering wheel of the vehicle and providing a set of measured steering wheel responses; and
    an execution sub-system comparing the set of model-generated steering wheel responses and the set of measured steering wheel responses, wherein the no-contact condition is detected based on the comparison between the set of model-generated steering wheel responses and the set of measured steering wheel responses.

19. The system according to claim 18 wherein estimating the plurality of parameters of the model is done using an arranged set of data, wherein the arranged set of data is a representation of a set of values of the plurality of parameters of the model corresponding to a set of vehicle speed values.

20. The system according to claim 18 wherein the plurality of parameters are selected from a group comprising a steady state gain, a damping ratio and a natural frequency of a vehicle steer system.

* * * * *